United States Patent [19]

Hagiwara

[11] Patent Number: 5,919,511
[45] Date of Patent: *Jul. 6, 1999

[54] PROCESS FOR THE PREPARATION OF A PLANT EMBRYO EXTRACT AND PRODUCT THEREOF

[76] Inventor: Yoshihide Hagiwara, 4-14, Hiraisanso, Takarazuka-shi, Hyogo 665, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/676,338
[22] PCT Filed: Jan. 17, 1995
[86] PCT No.: PCT/JP95/00034
§ 371 Date: Jul. 19, 1996
§ 102(e) Date: Jul. 19, 1996
[87] PCT Pub. No.: WO95/19716
PCT Pub. Date: Jul. 27, 1995

[30] Foreign Application Priority Data

Jan. 19, 1994 [JP] Japan .................................. 6-17725

[51] Int. Cl.$^6$ ........................................................ A23L 2/00
[52] U.S. Cl. ........................... 426/590; 426/430; 426/634; 426/650; 426/655
[58] Field of Search ..................................... 426/590, 430, 426/634, 650, 655

[56] References Cited

U.S. PATENT DOCUMENTS 2,975,066   3/1961   Baker et al. ............................. 426/430
4,339,466   7/1982   Van Gheluwe ......................... 426/430

FOREIGN PATENT DOCUMENTS 401275592   11/1989   Japan .

*Primary Examiner*—Helen Pratt
*Attorney, Agent, or Firm*—Sherman and Shalloway

[57] ABSTRACT

A process for the preparation of an embryo bud extract having high stability which comprises extracting defatted embryo buds with methanol or ethanol having a water content of not greater than 80% by weight. Drinks containing this embryo bud extract are very stable in that they produce no "sediment" and show no change in taste or flavor even after long-term storage, and are hence suitable for use as health drinks.

18 Claims, No Drawings

PROCESS FOR THE PREPARATION OF A PLANT EMBRYO EXTRACT AND PRODUCT THEREOF

TECHNICAL FIELD

This invention relates to a process for the preparation of a plant embryo extract having high stability and to drinks containing such an extract.

BACKGROUND ART

Plant embryos contain a large amount of linoleic acid which is an essential fatty acid, and also contain various water-soluble vitamins (chiefly vitamins $B_1$, $B_2$ and $B_6$); various fat-soluble vitamins (chiefly vitamin E); and K, Na, Ca, Mg and other essential trace elements. Accordingly, plant embryos are used as a raw material for the production of embryo oil. Moreover, defatted plant embryos are used as a raw material for food, livestock feed, fertilizer and the like. Furthermore, they are properly roasted and used as health food. Excepting them, no remarkable use thereof has not been developed.

The present inventor has previously proposed a process for the extraction of embryo components which comprises extracting cereal embryos with hot water at about 70° C. or above in the presence of an added starch hydrolase, boiling the extraction mixture without solid-liquid separation, and then subjecting the extraction mixture to solid-liquid separation (Japanese Patent Publication No. 1027/'80). However, when this extract is used to prepare embryo drinks, the sugars, proteins and other components contained therein precipitate as "sediment" with the lapse of time. This constitutes a serious obstacle to the preparation of drinks using plant embryos or defatted plant embryos as a raw material.

It is the primary object of the present invention to provide an embryo extract having high stability which extract is suitable for use in the preparation of drinks containing an abundance of components peculiar to plant embryos or defatted plant embryos (i,e., flavonoids, vitamins, minerals and the like) and having good storage stability.

DISCLOSURE OF THE INVENTION

The present inventor has made an intensive investigation with a view to developing a water-soluble embryo extract which has high stability and is suitable for the preparation of embryo drinks having good storage stability in that they produce no "sediment" and show no change in taste or flavor even after long-term storage. As a result, it has now been found that the above-described object can be accomplished by extracting defatted plant embryos with methanol or ethanol having a water content equal to or lower than a certain level. The present invention has been completed on the basis of this finding.

Thus, according to the present invention, there is provided a process for the preparation of an embryo extract having high stability which comprises extracting defatted plant embryos with methanol or ethanol having a water content of not greater than 80% by weight.

The defatted plant embryos which can be extracted according to the present invention include defatted embryos of cereals such as those of wheat, rice and corn. Among others, defatted embryos of wheat are preferred.

The methanol or ethanol used for the extraction of such defatted plant embryos may be in an anhydrous form containing essentially no water, but water-containing methanol or water-containing ethanol may also be used. However, it is desirable that the water content of such water-containing alcohols is not more than 80% by weight, preferably not more than 75% by weight, more preferably not more than 65% by weight, and most preferably not more than 40% by weight. Moreover, it is desirable to use ethanol rather than methanol. In practice, ethanol having a water content of 10 to 75% by weight is used to advantage.

Although the temperature used for the extraction may be varied according to the type of the alcohol, and the like, it generally ranges from room temperature to the boiling point of the solvent and preferably from room temperature to about 50° C. In some cases, the extraction may be carried out under pressure within a pressure vessel, or may be carried out while the solvent is heated under reflux.

Furthermore, the proportion of the aforesaid alcohol to the defatted plant embryos is not critical, but may be varied according to the water content of the alcohol used, and the like. However, the alcohol is usually used in an amount of about 1 to about 20 parts by weight, preferably about 2 to 15 parts by weight, and more preferably about 3 to about 10 parts by weight, per part by weight of the defatted plant embryos. More specifically, when defatted plant embryos are extracted, for example, with ethanol having a water content of 20% by weight, it is convenient to use the ethanol in an amount of 3 to 10 parts by weight per part by weight of the defatted plant embryos.

The extraction is conveniently carried out under the above-described conditions for a period of time ranging roughly from 0.5 to 24 hours and preferably from 0.5 to 12 hours.

A liquid extract can be separated according to a technique which is well known per se, such as filtration or centrifugation, and an embryo extract is obtained by removing the extraction solvent therefrom by evaporation, distillation or the like. This extract can be in the form of a concentrated extract obtained by concentrating the liquid extract, or in the form of a powder obtained by freeze drying, spray drying or the like. Spray drying may be carried out in a hot air having a temperature, for example, of 110 to 250° C. and preferably about 120 to 200° C. Moreover, prior to removal of the solvent or the formation of a powder by drying, additives including, for example, excipients such as dextrin, cyclodextrin and gum; vitamins such as vitamins $B_2$, $B_6$ and $B_{12}$ and vitamin C; amino acids such as methionine, taurine, tryptophan, lysine and cystine; minerals such as sodium, potassium, calcium, magnesium, iron, manganese, zinc, selenium, boron and seaweed mineral; sugars such as grape sugar, fruit sugar, cane sugar, isomerized sugar, malt sugar and liquid sugar; acids such as citric acid, lactic acid, tartaric acid and malic acid; and spices such as lemon essence, apple essence, strawberry essence, cinnamon, mint and ginger may be incorporated into the liquid extract or extract. Especially in the formation of a powder, it is preferable to add dextrin to the extract in an amount of generally 0.1 to 5 parts by weight, preferably 0.5 to 2 parts by weight, per part by weight of the solid content of the extract and then spray-dry the resulting mixture.

The embryo extract thus obtained has good solubility in water and can be incorporated into drinking water to prepare an embryo drink. At that time, in order to improve the taste of the drink, additives including, for example, vitamins such as vitamins $B_2$, $B_6$ and $B_{12}$; amino acids such as methionine, taurine, tryptophan, lysine and cystine; minerals such as sodium, potassium, calcium, magnesium, iron, manganese, zinc, selenium, boron and seaweed mineral; sugars such as grape sugar, fruit sugar, cane sugar, isomerized sugar, malt sugar and liquid sugar; acids such as citric acid, lactic acid, tartaric acid and malic acid; and spices such as lemon essence, apple essence, strawberry essence, cinnamon, mint and ginger may be incorporated into the drink as required. For example, one or more sugars may be incorporated into the drink in a total amount of about 5 to about 20% by weight and preferably about 7 to about 15% by weight. Moreover, small amounts of vitamin C and citric acid may also be added thereto.

The amount of embryo extract added to drinking water is not particularly limited, but may be varied at will. However, the concentration of the embryo extract in the drink may generally be in the range of 0.1 to 5% by weight and preferably 0.5 to 3% by weight.

Furthermore, the embryo extract in accordance with the present invention can also be incorporated into various types of drinks such as refreshing beverages, dairy products and liquors.

EXAMPLES

The present invention is further illustrated by the following examples. Unless otherwise stated, all percentages are by weight.

Example 1

To 1 kg of defatted wheat embryos was added 9 kg of ethanol having a water content of 20%. Extraction was carried out by stirring the mixture at room temperature (18–20° C.) for an hour. After filtration, ethanol was removed from the liquid extract by distillation. To the resulting extract was added dextrin in an amount equal to the solid content of the extract. This mixture was spray-dried under conditions including an inlet temperature of 140° C. and an outlet temperature of 80° C. Thus, 220 g of an embryo extract was obtained from 1 kg of defatted wheat embryos.

Example 2

The extraction and drying procedures were carried out in the same manner as described in Example 1, except that 5 kg of ethanol having a water content of 40% was used in place of 9 kg of ethanol having a water content of 20%. Thus, 300 g of an embryo extract was obtained from 1 kg of defatted embryos.

Example 3

The extraction and drying procedures were carried out in the same manner as described in Example 1, except that 7 kg of methanol having a water content of 20% was used in place of 9 kg of ethanol having a water content of 20%. Thus, 250 g of an embryo extract was obtained from 1 kg of defatted embryos.

Example 4

Using the wheat embryo extract obtained in Example 1, a drink was prepared according to the following formulation. When this drink was heated at 95° C. for an hour and kept at room temperature for an hour, its taste and flavor were both stable.

| | |
|---|---|
| Granulated sugar | 7% |
| Liquid sugar | 3% |
| Citric acid | 0.2% |
| Vitamin C | 0.1% |
| Wheat embryo extract | 1% |

Example 5

The wheat embryo extract obtained in Example 3 was added to a 10% aqueous solution containing a mixture of equal amounts of fruit sugar and isomerized sugar. When this solution was heated at 95° C. for an hour and allowed to stand at room temperature for a year, it produced no sediment and its taste and flavor were both stable.

Example 6

To 1 kg of defatted rice embryos was added 9 kg of ethanol having a water content of 20%. Extraction was carried out by stirring the mixture at room temperature (18–20° C.) for an hour. After filtration, ethanol was removed from the liquid extract by distillation. To the resulting extract was added dextrin in an amount equal to the solid content of the extract. This mixture was spray-dried under conditions including an inlet temperature of 140° C. and an outlet temperature of 80° C. Thus, 220 g of an embryo extract was obtained from 1 kg of defatted rice embryo buds.

Example 7

To 1 kg of defatted corn embryo buds was added 9 kg of ethanol having a water content of 20%. Extraction was carried out by stirring the mixture at room temperature (18–20° C.) for an hour. After filtration, ethanol was removed from the liquid extract by distillation. To the resulting extract was added dextrin in an amount equal to the solid content of the extract. This mixture was spray-dried under conditions including an inlet temperature of 140° C. and an outlet temperature of 80° C. Thus, 220 g of an embryo extract was obtained from 1 kg of defatted corn embryos.

Example 8

Using the rice embryo bud extract obtained in Example 6, a drink was prepared according to the following formulation.

| | |
|---|---|
| Granulated sugar | 7% |
| Grape sugar | 3% |
| Citric acid | 0.2% |
| Vitamin C | 0.1% |
| Rice embryo extract | 1% |

When this drink was heated at 95° C. for an hour and allowed to stand at room temperature for a year, its taste and flavor were both stable.

Example 9

Using the corn embryo extract obtained in Example 7, a drink was prepared according to the following formulation.

| | |
|---|---|
| Granulated sugar | 7% |
| Grape sugar | 3% |
| Citric acid | 0.2% |
| Vitamin C | 0.1% |
| Corn embryo extract | 1% |

When this drink was heated at 95° C. for an hour and allowed to stand at room temperature for a year, its taste and flavor were both stable.

Industrial Applicability

As described above, embryo extracts obtained by extracting defatted embryos with methanol or ethanol having a water content of not greater than 70% according to the present invention are stable and have high solubility in water. Drinks containing such an embryo extract are very stable in that they produce no "sediment" and show no change in taste or flavor even after long-term storage, and are hence suitable for use as drinks for the maintenance and promotion of health.

I claim:

1. A plant embryo drink containing
   a plant embryo extract prepared by a process which comprises contacting defatted plant embryos with methanol or ethanol having a water content of not greater than 80% by weight to form a liquid extract, separating said liquid extract from said defatted plant embryos, and separating said methanol or ethanol from said liquid extract; and
   at least one member selected from the group consisting of excipients, vitamins, amino acids, minerals, sugars, acids and spices.

2. A drink as claimed in claim 1 which contains the plant embryo extract at a concentration of 0.1 to 5% by weight.

3. The drink as claimed in claim 1, wherein the defatted plant embryos are extracted with methanol or ethanol having a water content of not greater than 75% by weight.

4. The drink as claimed in claim 1, wherein the defatted plant embryos are extracted with ethanol having a water content of 10 to 75% by weight.

5. The drink as claimed in claim 1, wherein the defatted plant embryos are defatted embryos of wheat, rice or corn.

6. The drink as claimed in claim 1, wherein the defatted plant embryos are defatted embryos of wheat.

7. The drink as claimed in claim 1, wherein said extraction is carried out at a temperature ranging from room temperature to the boiling point of the solvent.

8. The drink as claimed in claim 1, wherein the methanol or ethanol is used in an amount of 1 to 20 parts by weight per part by weight of the defatted plant embryos.

9. The drink as claimed in claim 1, wherein the methanol or ethanol is used in an amount of 2 to 15 parts by weight per part by weight of the defatted plant embryos.

10. The drink as claimed in claim 1, wherein said process of preparing a plant embryo extract further comprises freeze-drying or spray-drying said liquid extract from which said methanol or ethanol has been separated to form a powder.

11. The drink as claimed in claim 1, wherein said process of preparing a plant embryo extract further comprises adding dextrin to said liquid extract from which said methanol or ethanol has been separated and spray-drying the resulting mixture to form a powder.

12. The drink as claimed in claim 1, wherein said excipient is dextrin, cyclodextrin or gum.

13. The drink as claimed in claim 1, wherein said vitamin is vitamin $B_2$, vitamin $B_6$, vitamin $B_{12}$, or vitamin C.

14. The drink as claimed in claim 1, wherein said amino acid is methionine, taurine, tryptophan, lysine or cystine.

15. The drink as claimed in claim 1, wherein said mineral is sodium, potassium, calcium, magnesium, iron, manganese, zinc, selenium, boron or seaweed mineral.

16. The drink as claimed in claim 1, wherein said sugar is grape sugar, fruit sugar, cane sugar, isomerized sugar, malt sugar or liquid sugar.

17. The drink as claimed in claim 1, wherein acid is citric acid, lactic acid, tartaric acid and malic acid.

18. The drink as claimed in claim 1, wherein said spice is lemon essence, apple essence, strawberry essence, cinnamon, mint or ginger.

* * * * *